United States Patent [19]
Khalid

[11] Patent Number: 5,836,687
[45] Date of Patent: Nov. 17, 1998

[54] ADJUSTABLE HEIGHT FOOD MIXER

[76] Inventor: Fasih Uddin Khalid, 91A, Tsung Lan Shui, Clear Water Bay Road, Kowloon, Hong Kong

[21] Appl. No.: 855,305

[22] Filed: May 13, 1997

[30] Foreign Application Priority Data

May 30, 1996 [GB] United Kingdom .................... 9611307

[51] Int. Cl.⁶ .................................................. A47J 43/044
[52] U.S. Cl. ........................................... 366/207; 366/207
[58] Field of Search ....................... 366/96–98, 197–204, 366/207, 261, 285, 286, 287, 288, 332, 333; 99/348

[56] References Cited

U.S. PATENT DOCUMENTS

| | | | |
|---|---|---|---|
| 2,016,554 | 10/1935 | Nichols | 366/201 X |
| 3,362,691 | 1/1968 | Shilling | 366/197 |
| 3,630,494 | 12/1971 | Patton | 366/201 X |
| 5,150,967 | 9/1992 | Neilson et al. | 366/197 X |
| 5,533,805 | 7/1996 | Mandel | 366/197 X |

*Primary Examiner*—Charles E. Cooley
*Attorney, Agent, or Firm*—Miller, Sisson, Chapman & Nash, P.C.

[57] ABSTRACT

A food mixer has a frame with a base and two upstanding columns. A bridge, which includes an electric motor housing, is slidingly mounted to the columns. Thumb presses are provided to release locks that hold the bridge in the position shown in FIG. 1 or closer to the top of the frame. This movement allows a food whisk to be raised out of a bowl as required when food mixing has been completed. The food mixers of the present invention generally require less space in use and for storage than comparable known food mixers.

1 Claim, 3 Drawing Sheets

ADJUSTABLE HEIGHT FOOD MIXER

BACKGROUND OF THE INVENTION

1. Field of the Invention

The invention relates to domestic food mixers for use in the kitchen of a home or restaurant.

2. Description of Prior Art

Food mixers are well-known and usually comprise a stand for supporting a food mixing or blending bowl, and an electric motor arranged with a mechanical drive connecting the motor to an implement holder positioned in use above the bowl. The holder releasably supports various implements, such as beaters, whisks, dough hooks and so forth as required, that extend down into inside the bowl. When mixing or blending is completed, the holder is raised up by hinging away an upper support member to allow the bowl to be removed. Food mixers presently available are therefore required to be generally fairly bulky, so as to provide a firm or stable location for the holder in particular. Present food mixers also incorporate a mechanical drive, that must alter the rotational driving axis, to connect a rotor of the electric motor and the holder. This is because the rotor and the spindle inherently have axes of rotation angled to one another. Quite often the mechanical drive must separate when the upper support is hinged away adding to such complications.

SUMMARY OF THE INVENTION

It is an object of the invention to overcome or to reduce this problem.

According to the invention there is provided a domestic food mixer having an electric motor and an implement holder drivingly connected to the motor, a frame having a central base with two upstanding columns to slidingly support a bridge carrying a motor housing for the motor, the holder being mounted below the motor, in which the motor can be moved up and down as required between two operative positions and be supported by sliding the bridge up and down the columns so that, when an implement is fitted to the holder, the motor can be arranged in one operative position for mixing food in a bowl positioned on the base and in the other operative position to allow the bowl to be removed from beneath the implement.

The motor is preferably manually slidable and the mixer include manually releasable locks mounted in the columns that respectively hold the motor in its two operative positions.

The motor is preferably mounted with its rotor on a central axis of the mixer.

There are preferably two upstanding columns diametrically opposite one another and equidistant from a central axis of the mixer.

A link member may be connected to the upstanding columns above the bridge and form a carrying handle for the mixer.

The link member may be sliding coupled to the columns and arranged to be movable up and down with respect to the columns.

The effective lengths of each upstanding column may be arranged to be shortened enabling the overall height of the food mixer to be minimised for storage and transportation.

BRIEF DESCRIPTION OF THE DRAWINGS

An electric food mixer according to the invention will now be described by way of example with reference to the accompanying diagrammatic drawings in which.

DESCRIPTION OF THE PREFERRED EMBODIMENTS

Figure 1:
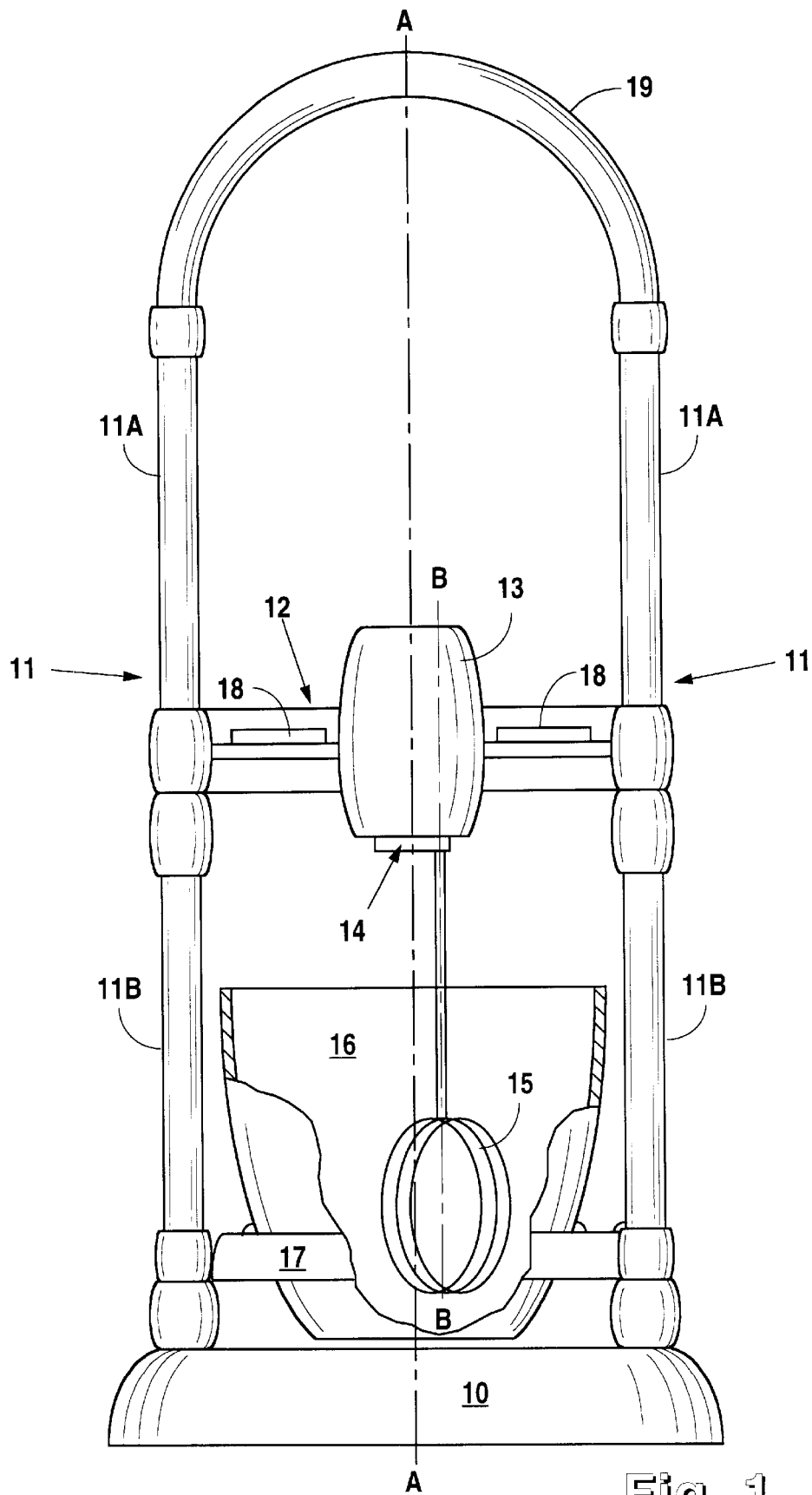
FIG. 1 shows a side view of the mixer in a first operative position and a mixing bowl which is partly cut away.

Referring to the drawings, the food mixer comprises a stand or a frame which has a base 10 having a pair of opposed upstanding columns 11 formed of rigid cylindrical tubing. The columns 11 are equidistant from a central axis A of the mixer. A bridge 12 is slidingly connected to the columns 11 and integrally forms or supports a motor housing 13 of an electric motor 13A. An implement holder 14 is mounted directly to and below the motor to provide in use planetary rotational motion, in a manner known per se, to a food whisk 15.

Figure 2:
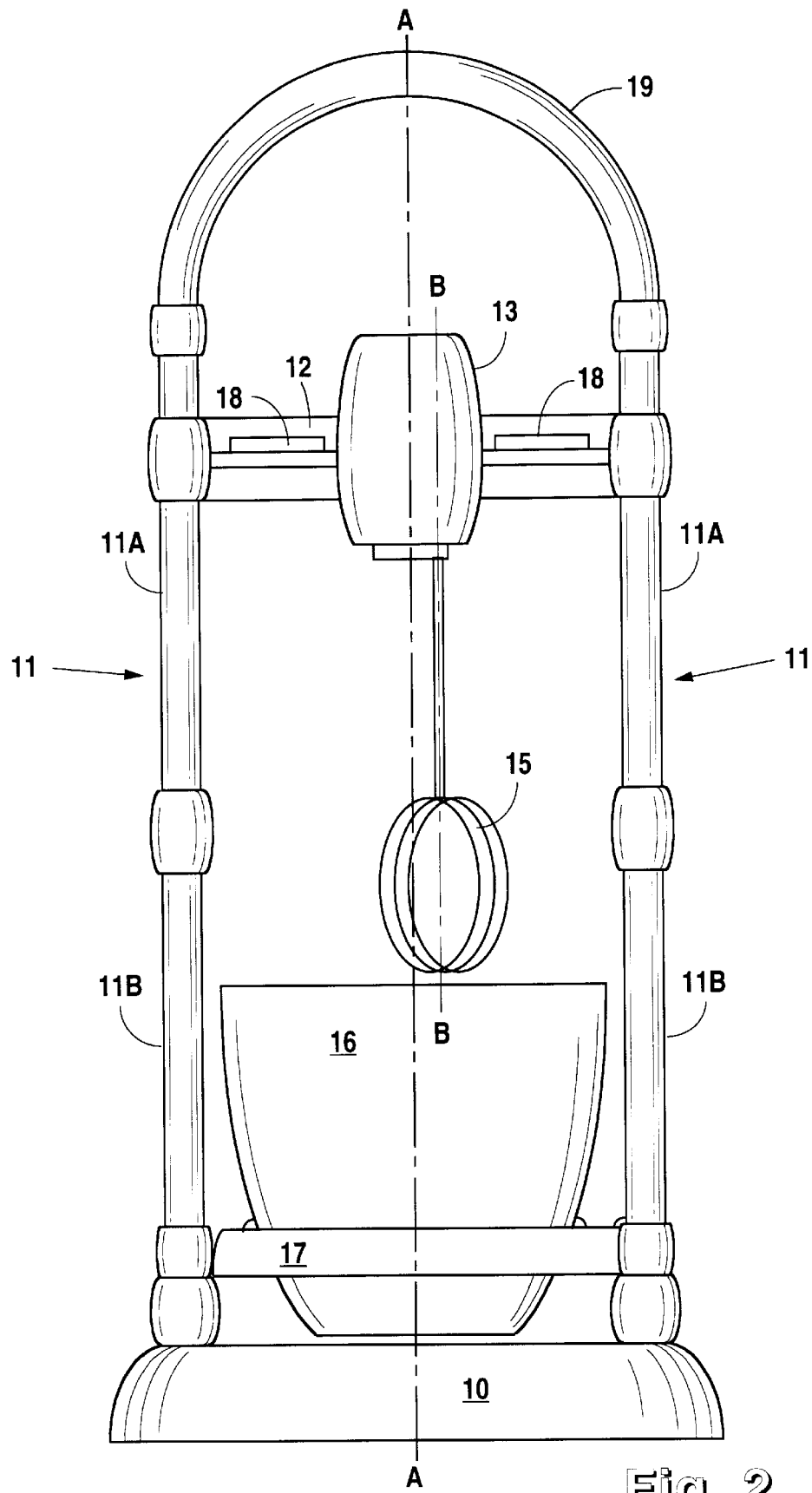
FIG. 2 shows a side view of the mixer in a second operative position.
Figure 3:
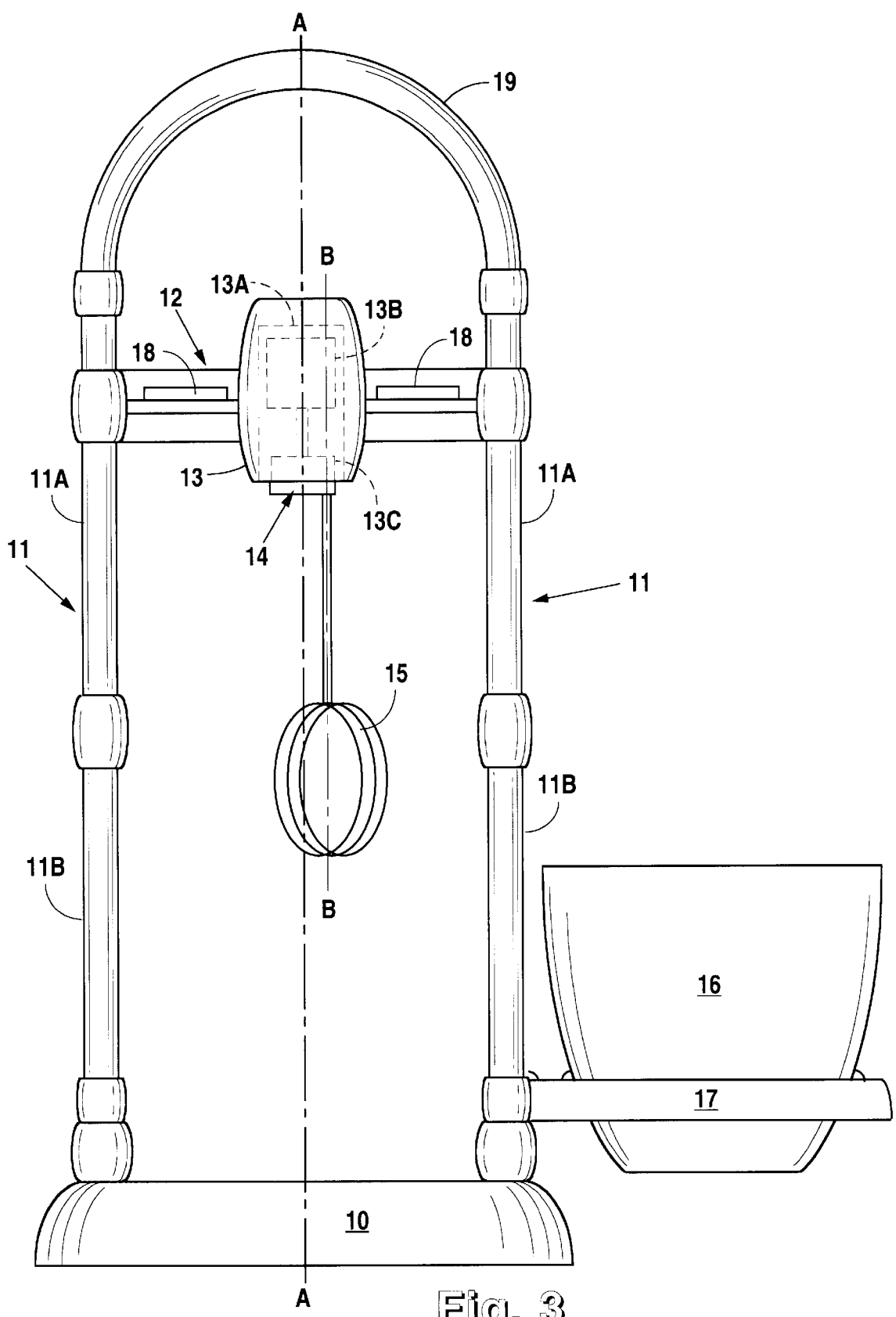
FIG. 3 shows FIG. 2 the mixer with the mixing bowl in a different position.

A mixing bowl 16 is supported below the whisk 15 by a ring or cradle 17 that is swivellable on one of the columns 11. The cradle may be swivelled to the position shown in FIG. 3 so that the bowl 16 can be more easily charged, for example, with food ingredients before mixing or whisking commences. Thumb presses 18 are mounted in the bridge 12 and mechanically linked to release spring biassed locking mechanisms (not shown) that hold the bridge 12 stationary relative to the columns 11. When the presses 18 are depressed, the bridge 12 can slide up the columns to the position shown in FIG. 2, where second locking mechanisms (not shown) hold the bridge 12 in position, until the presses 18 are depressed again. A stabilizing link 19 connects the tops of the columns 11 together and forms a lifting handle for the food mixer. Thus, in the described food mixer the electric motor and attached implements can be manually moved between two positions where the bridge 12 is supported by the frame shown respectively in FIGS. 1 and 2. The upstanding columns are sufficiently sturdy to hold the electric motor and the implements firmly in position during food mixing as required. It will be appreciated that reactive forces acting on the implements can be quite large especially if the food mixer is used for kneading bread dough, for example.

The rotational axis of the motor and rotor 13B and the rotary axis B of the implements may be the same, or such axes are parallel as shown in the figures, and so relatively simple mechanical drive connections or gearing 13C is required between the motor and the holder 14. The direct movement of the motor towards and away from the mixing bowl between its two operative positions, as opposed to some kind of a hinged arrangement as in prior food mixers, is simpler and more efficient mechanically than before. That is to say, moving up and down in a straight line requires less space than applying a pivoting movement to lift the implements clear and out of the bowl. This enables the food mixer to be more compact and which requires less space for use.

In modifications of embodiments of the invention, parts 11A of the columns shown above the bridge 12 in FIG. 1 and the link 19 may be removable for storage. This makes the effective height of food mixer for storage much less. In one modification, the upper parts 11A of the columns fit into and extend down inside lower column parts 11B. The bridge 12 then slides up and down on the upper parts of the columns when the motor is moved up and down. The link 19 may extend as shown in the Figures, or more so, with tubes at its extremities that can slide inside the column parts 11A. When not locked in position, the link can be pushed closer to the bridge and hence the overall height of the mixer is reduced for storage.

It will be appreciated that whereas this specification refers specifically to food mixer and food blender, the invention relates to any "food-mixer" that mixes, blends, whisks or otherwise acts to prepare food for catering or cooking in a kitchen. Stand-alone food mixers are per se well-known but embodiments of the invention incorporate novel forms of support frame that enable the otherwise normal food mixing implements to be supported by or connected by a relative simple mechanical drive to an electric motor and moved readily in and out of a mixing bowl as required. The support frames may be arranged to be at least partially dismantled for storage if desired.

The columns 11 may also be made in sections or parts and formed in the manner of a camera tripod leg for example to allow for telescopic extension. Such columns can be shortened for storage of the food mixer.

Although it is preferable to have two columns, more than two columns, and especially three columns, may be used. Each column may also be "cranked" so that the columns are more spread out around the bowl than above, where the motor is supported. As such, the bridge 12 may be provided with very short limbs at either side of the housing 13.

I claim:

1. A domestic food mixer comprising: an electric motor with a rotor and an implement holder drivingly connected to said motor, a frame having a central base with at least two upstanding columns equidistant from a central axis of said mixer to slidingly support a bridge carrying a motor housing for said motor, said holder being mounted below said motor, said motor movable up and down between two operative positions and supported by sliding said bridge up and down said columns; an implement fitted to said holder, said motor arrangeable in a first operative position for mixing food in a bowl positioned on said base and in a second operative position to allow said bowl to be removed from beneath said implement, said motor mounted with said rotor on said central axis of said mixer, and a link member connected to said upstanding columns above said bridge forming a carrying handle for said mixer, said link member slidingly engaged with said columns and movable up and down said columns.

* * * * *